United States Patent [19]
Smid

[11] Patent Number: 5,897,186
[45] Date of Patent: *Apr. 27, 1999

[54] DISPLAY DEVICE WITH DISCOLORATION—PREVENTION ELECTRODES

[75] Inventor: Reinder Smid, Heerlen, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,770

[22] Filed: Dec. 1, 1995

[30] Foreign Application Priority Data

Dec. 1, 1994 [EP] European Pat. Off. .............. 94203495

[51] Int. Cl.⁶ ........................ G02F 1/1343; G02F 1/1345
[52] U.S. Cl. ............................ 349/143; 349/149; 349/34
[58] Field of Search ............... 349/34, 139, 143, 349/149, 151, 152; 345/87

[56] References Cited

U.S. PATENT DOCUMENTS

| | | | |
|---|---|---|---|
| 4,412,214 | 10/1983 | Tanaka et al. .................... | 349/143 |
| 4,422,731 | 12/1983 | Droguet et al. .................. | 349/151 |
| 5,084,778 | 1/1992 | DeJule et al. ..................... | 349/139 |
| 5,124,818 | 6/1992 | Conner et al. .................... | 349/143 |
| 5,406,398 | 4/1995 | Suzuki et al. .................... | 349/143 |
| 5,442,469 | 8/1995 | Pitt .................................... | 349/139 |
| 5,488,498 | 1/1996 | Fujii et al. ......................... | 349/149 |
| 5,500,787 | 3/1996 | Yoshida ............................. | 349/42 |
| 5,619,358 | 4/1997 | Tanaka et al. ..................... | 349/155 |

FOREIGN PATENT DOCUMENTS 1-133032   5/1989   Japan .
3-290621  12/1991   Japan .

OTHER PUBLICATIONS

Patent Abstracts of Japan, vol. 16, No. 30, pp. 1379, A, 4–81887 (Hitachi Ltd) Mar. 16, 1992.
Patent Abstracts of Japan, vol. 16, No. 123, pp. 1330, A, 3–290621 (Alps Electric Co. Ltd), Dec. 20, 1991.
Patent Abstracts of Japan, vol. 17, No. 127, p. 1502 A, 4–307518 (Matsushita Electric Ind Co. Ltd), Oct. 29, 1992.

*Primary Examiner*—William L. Sikes
*Assistant Examiner*—Tai V. Duong
*Attorney, Agent, or Firm*—David R. Treacy

[57] ABSTRACT

Display device comprising an electro-optical medium, for example an LCD of the (super)twisted nematic type in which the capacitive influence on the switching behaviour of extra (dummy) electrodes employed to neutralize the difference in electro-optical behaviour (discoloration) is compensated by giving the extra electrodes a fixed voltage or by providing a pattern of the dummy electrodes on the other substrate, particularly on non-overlapping parts of the picture electrodes.

19 Claims, 3 Drawing Sheets

DISPLAY DEVICE WITH DISCOLORATION— PREVENTION ELECTRODES

BACKGROUND OF THE INVENTION

The invention relates to a display device comprising an electro-optical medium between two supporting plates provided with electrodes which define pixels at overlap locations. The invention particularly relates to such a display device in which the electrodes on at least one supporting plate extend on the supporting plate beyond the area of the pixels where they are provided with drive elements.

The electro-optical medium is, for example a liquid crystal material, particularly a (super)twisted nematic liquid crystal material.

Such display devices are used in alphanumerical displays for measuring instruments, dashboards etc., but also, for example in computer monitor screens.

Display devices of the type described above are generally known. A problem which may occur particularly, but not exclusively in supertwisted nematic liquid crystal display devices is the phenomenon of discoloration because the distance between the two supporting plates is not the same throughout; notably this distance differs at the location of (between) two pixel-defining electrodes from that at the location of (between) an electrode and a supporting plate not provided with an electrode. Since the color difference increases at larger thicknesses of the electrodes, this problem frequently occurs in display devices in which the electrodes on at least one supporting plate extend on the supporting plate beyond the area of the pixels where they are provided with drive elements, because the electrode tracks should have a minimum thickness to ensure a good contact for connecting these drive elements, for example via chip-on-glass (COG) techniques. Moreover, a certain thickness is advantageous because there will be less voltage drop across the electrode and a more uniform display is obtained. The minimum thickness for this purpose is approximately 100 nm.

SUMMARY OF THE INVENTION

It is, inter alia an object of the present invention to mitigate the above-mentioned problem as much as possible.

To this end a display device according to the invention is characterized in that extra electrodes having substantially the same thickness as the pixel-defining electrodes are provided between the pixel-defining electrodes on at least a first supporting plate, and in that the display device comprises means for supplying the extra electrodes with a voltage during operation.

By providing extra electrodes between the pixel-defining electrodes, it is achieved that differences in the thickness of the liquid crystal layer and hence discolorations are reduced considerably. Since the extra electrodes can be provided with a voltage, it can be prevented that pixels are provided with the wrong picture contents due to electric crosstalk via the extra electrodes.

A device according to the invention in which the electrodes on at least the first supporting plate extend on the supporting plate beyond the area of the pixels where they are provided with drive elements is characterized in that extra electrodes having substantially the same thickness as the pixel-defining electrodes are provided between the pixel-defining electrodes on at least the first supporting plate, and in that the display device comprises means for supplying the extra electrodes with a voltage during operation. The extra electrodes have a thickness of at least 100 nm in this case.

Applying a voltage to the extra electrodes is not always readily possible, for example because the number of external connections is to be limited as much as possible. In that case, a display device according to the invention is characterized in that extra electrodes having substantially the same thickness as the pixel-defining electrodes are provided between the pixel-defining electrodes on a first supporting plate, the extra electrodes being mainly present at locations which, viewed transversely to the display device, are present between pixel-defining electrodes on the other supporting plate. This limits crosstalk.

It is to be noted that the provision of extra (dummy) electrodes to inhibit discoloration is known per se from JP-A 3-290621, but here the electrodes are not provided with an electric voltage (they are electrically insulated), while there is neither any question of a given pattern to prevent crosstalk.

The electrodes and the extra electrodes are preferably made of the same material, for example indium tin oxide. An additional advantage is the antireflective effect of such electrodes.

Although the measures for reducing discoloration and crosstalk consist of providing extra electrodes on the first substrate, these measures can also be extended to the second substrate.

A further embodiment of the display device, in which the extra electrodes can be provided with a fixed voltage, is therefore characterized in that extra electrodes having substantially the same thickness as the pixel-defining electrodes are provided between the pixel-defining electrodes on the other supporting plate, and in that the display device comprises means for supplying the extra electrodes on the other supporting plate with a voltage during operation. A further embodiment of the display device, in which the extra electrodes are provided with a pattern, is then characterized in that extra electrodes having substantially the same thickness as the pixel-defining electrodes are provided between the pixel-defining electrodes on the other supporting plate, the extra electrodes being mainly present at locations which, viewed transversely to the display device, are present between pixel-defining electrodes on the first supporting plate.

Also the area outside the actual image plane is preferably provided with extra electrodes so as to obtain a minimal thickness variation throughout the surface.

To this end, a further embodiment of the display device according to the invention is characterized in that the extra electrodes on at least one of the supporting plates extend substantially throughout the supporting plate across parts of the supporting plate surface exposed by (that is, not covered by) the pixel-defining electrodes and the supply electrodes connected thereto.

BRIEF DESCRIPTION OF THE DRAWINGS

These and other aspects of the invention will be apparent from and elucidated with reference to the embodiments described hereinafter.

In the drawings:

FIG. 4 shows diagrammatically a part of FIG. 1, while

DETAILED DESCRIPTION OF THE PREFERRED EMBODIMENTS

Figure 1:
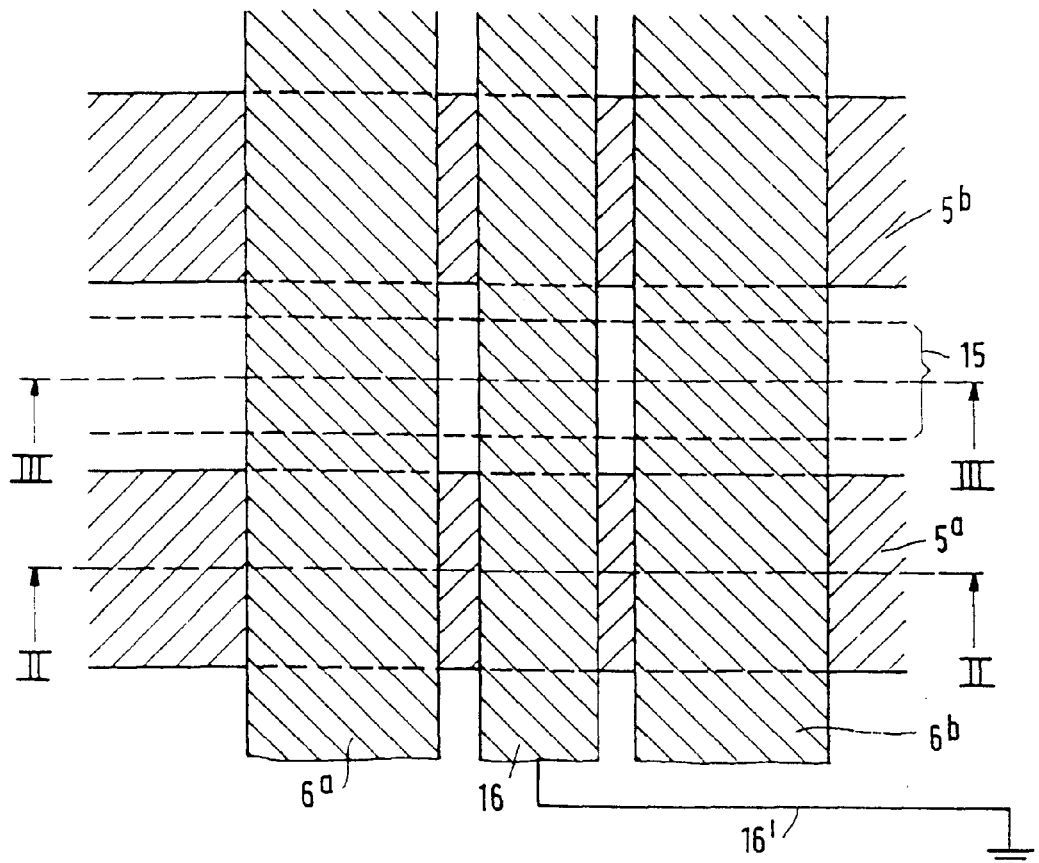
FIG. 1 is a diagrammatic plan view of a part of a display device according to the invention.
Figure 2:
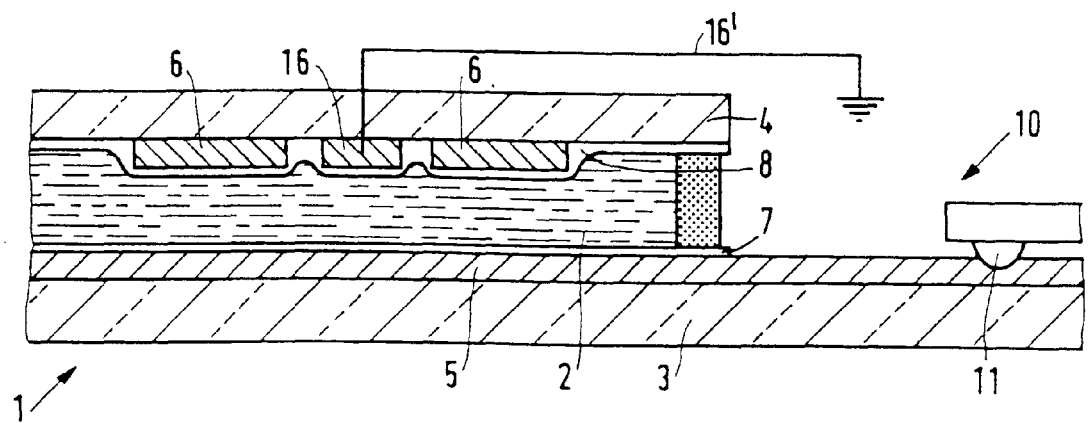
FIG. 2 is a diagrammatic cross-sectional view taken on the line II—II in FIG. 1.
Figure 3:
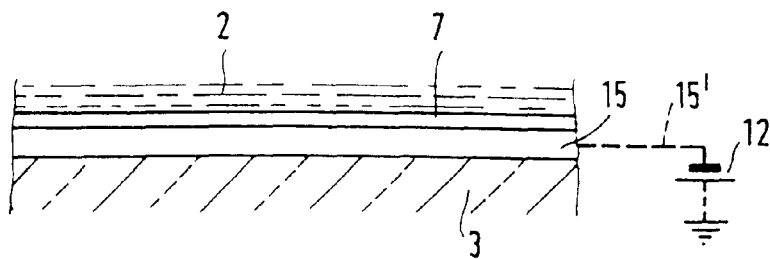
FIG. 3 is a diagrammatic cross-sectional view taken on the line III—III in FIG. 1.

FIGS. 1, 2 and 3 are diagrammatic plan views and cross-sections taken on the lines II—II and III—III in FIG. 1 of a part of a liquid crystal display device comprising a liquid crystal cell 1 with a twisted nematic liquid crystal material 2, in this example a supertwisted nematic liquid crystal material which is present between two substrates 3, 4 of, for example glass provided with electrodes 5, 6 which are transparent in this example and are made of, for example indium tin oxide (ITO). The device further comprises orientation layers 7, 8 which orient the liquid crystal material on the inner walls of the substrates in such a way in this example that the cell has a twist angle of, for example 240°. If necessary, the device further comprises one or two polarizers (not shown) and the conventional insulating layers between ITO and glass and/or between ITO and orientation layers. In this case, the liquid crystal material has a positive optical anisotropy and a positive dielectric anisotropy.

The display device further comprises (see FIG. 2) one or more drive elements 10, in this example integrated circuits (ICs) which are connected to the electrodes 5 by means of chip-on-glass technology, for example by means of thermo-compression or soldering in such a way that the bumps 11 establish a satisfactorily conducting contact with these conducting electrodes 5. Similarly as shown for the conductors 5, the conductors 6 on the substrate 4 may be connected to the electrodes 6 by means of a chip-on-glass technology.

To obtain a satisfactory electric contact via the bump 11, this electrode should have a thickness of at least 100 nm. Moreover, at such a thickness, the resistance of the ITO electrodes has a small influence on the display effect. This means that the thickness of the liquid layer at an original distance of the supporting plates of, for example 6 $\mu$m has a thickness of approximately 5.8 $\mu$m at the location of the pixels, and at locations where picture electrodes are arranged opposite a supporting plate it may have a thickness of approximately 5.9 $\mu$m and the original thickness of approximately 6 $\mu$m at locations where no picture electrodes are present. This variation leads to color differences which can be partly compensated by providing extra electrodes 15, 16 having substantially the same thickness as the electrodes 5, 6 between the electrodes 5, 6 so that the variation of thickness of the liquid crystal layer 2 is reduced. For process-technological reasons, the extra electrodes 15, 16 are preferably made of the same material as the electrodes 5, 6.

Figure 4:
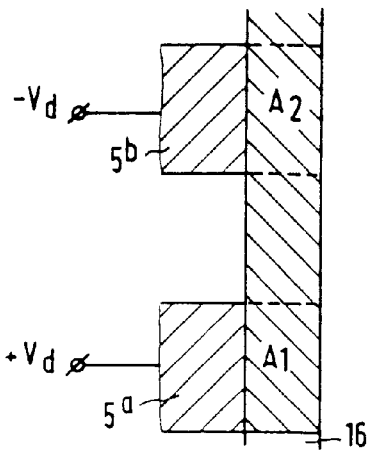

However, it appears in practice that such a solution is not sufficient, which will be further explained with reference to FIG. 4. This Figure shows the situation in which an extra electrode 16 is located opposite two electrodes $5^a$, $5^b$ with liquid crystal material in between, as is shown in FIGS. 1, 2. The overlapping parts of the extra electrode 16 and the electrodes $5^a$, $5^b$ are assumed to have surfaces $A_1$ and $A_2$. If the electrodes $5^a$, $5^b$ are driven by, for example voltages $+V_d$ and $-V_d$, respectively (which voltages are customary in datagraphic display devices), the opposite (floating) extra electrode 16 acquires a voltage of $V=((A_1-A_2)/(A_1+A_2)).V_d$ due to capacitive crosstalk. The voltage differences between the extra electrode 16 and the electrodes $5^a$, $5^b$ will then be $V_1=-2(A_2/(A_1+A_2)).V_d$ and $V_2=2(A_1/(A_1+A_2)).V_d$, respectively. If these voltages exceed the threshold voltage of the liquid crystal material, unwanted information will be visible. According to the invention, this can be prevented by suppressing said capacitive crosstalk. To this end, the extra electrodes 15, 16 are connected to ground (FIGS. 1, 2) via connections 15', 16' shown diagrammatically, or to a fixed voltage source 12 (FIG. 3) in the embodiments of FIGS. 1, 2 and 3. To ensure the operation of such an extra electrode as satisfactorily as possible, the distance between the electrodes and the extra electrodes is chosen to be as small as possible, for example at most 100 $\mu$m and preferably at most 50 $\mu$m. At smaller distances, the risk of short-circuit increases due to process tolerances.

Figure 5:
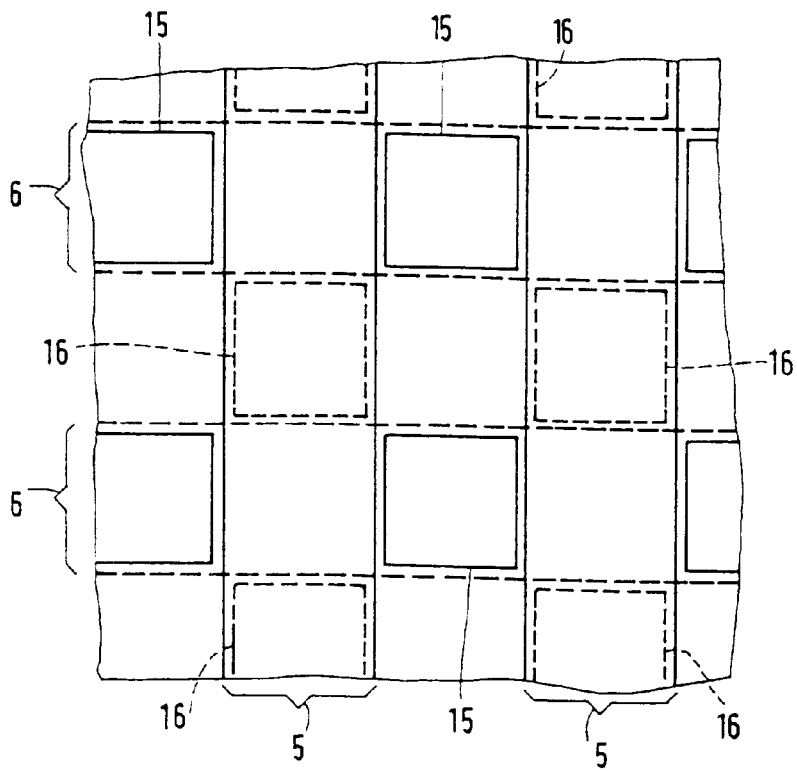
FIG. 5 is a diagrammatic plan view of a part of a further display device according to the invention.

If it is not possible to connect extra electrodes due to, for example layout-technical problems or for other reasons, the capacitive coupling may also be interrupted by not providing an extra electrode on the opposite supporting plate at the location of the electrode overlaps. The extra electrodes 15, 16 then acquire a pattern as is shown by way of example in FIG. 5.

Figure 6:
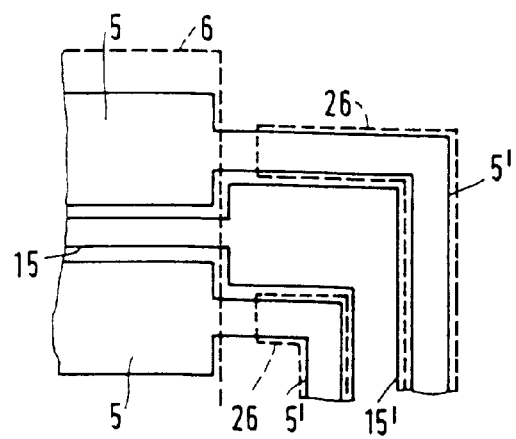
FIG. 6 is a diagrammatic plan view of a part of another display device according to the invention.

The invention is of course not limited to the examples shown, but said measures (connecting the extra electrodes to ground or to a fixed voltage, providing the extra electrodes in a pattern so that overlap is avoided) are also applicable to other display devices, for example for less thick tracks 5, 6 if no COG techniques are used or for twisted nematic liquid layers having a smaller twist angle. In both cases, the risk of incorrect information due to crosstalk and influencing of the picture contents (discoloration) is reduced. The invention is also applicable to other electro-optical media in which the layer thickness plays a role because of optical properties. The extra electrodes 16 on the second substrate may also be present opposite parts of the pixel-defining electrodes 5 which are outside the actual image plane as is shown in FIG. 6 by the electrode 26 (shown in broken lines) for a configuration of pixel-defining electrodes 5 on a first substrate between which extra electrodes 15 and 15' (outside the actual image plane) are present, while extra electrodes (dummy electrodes) 26 are present on the second substrate opposite the connection electrodes 5' located on the first substrate.

Figure 7:
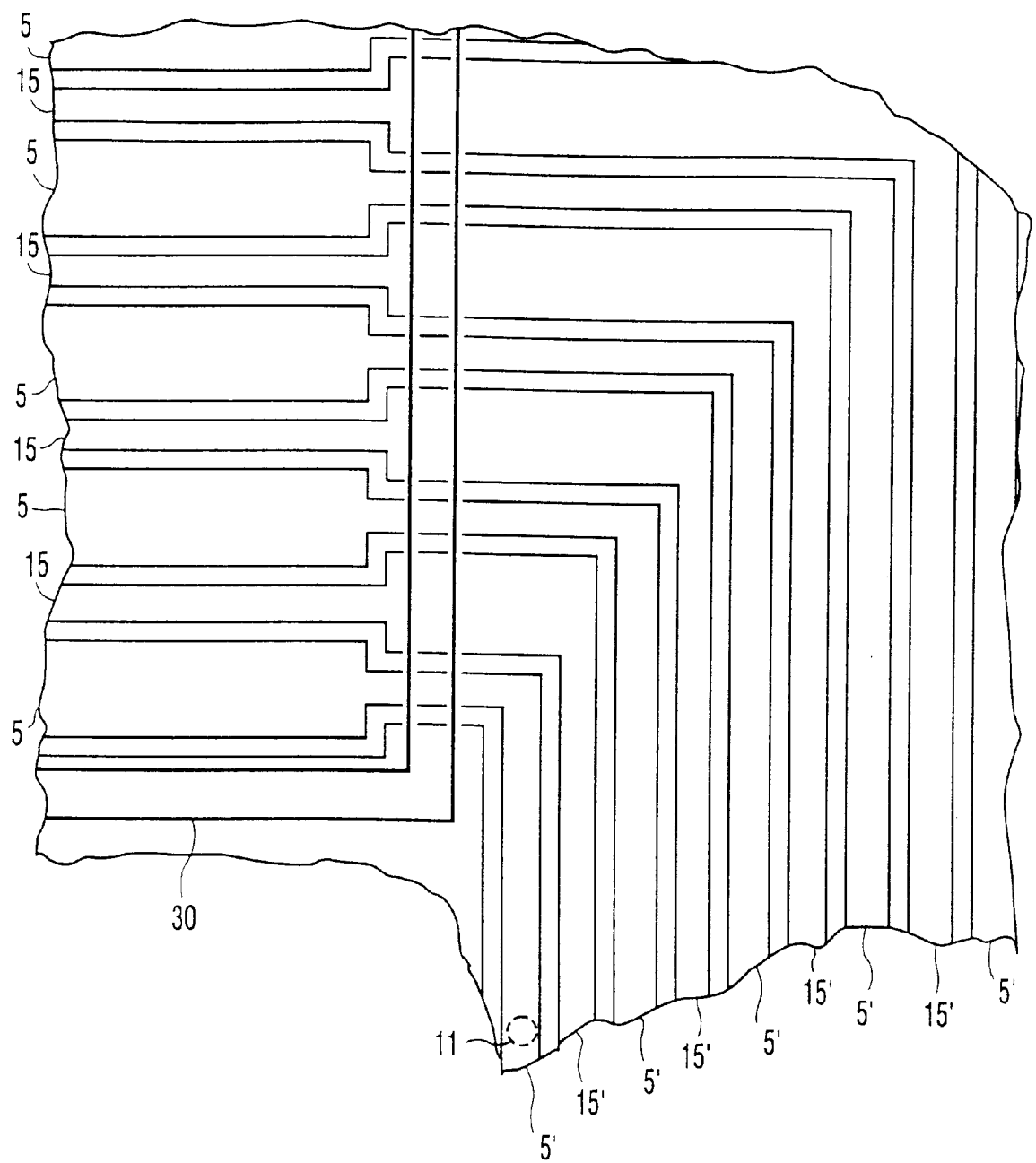
FIG. 7 is a diagrammatic plan view of part of a display device of still another display device according to the invention, and The Figures are diagrammatic and not to scale: corresponding parts are usually denoted by the same reference numerals.

As shown in FIG. 7, the extra electrodes on at least one of the supporting plates may extend substantially throughout the supporting plate, across the exposed parts; that is, those parts not covered by the pixel-defining electrodes and the supply electrodes connected to those pixel-defining electrodes. The electro-optical medium is confined to the part of the display bounded by the sealing wall 30, while the part outside the sealing wall contains supply electrodes 5' and drive elements connected at bumps 11.

In summary, the invention provides a display device comprising an electro-optical medium, for example an LCD of the (super)twisted nematic type, in which the capacitive influence on the switching behaviour of extra (dummy) electrodes employed to neutralize the difference in electro-optical behaviour (discoloration) is compensated by giving the extra electrodes a fixed voltage or by providing a pattern of the dummy electrodes on the other substrate particularly on non-overlapping parts of the picture electrodes.

What is claimed is:

1. A display device comprising two supporting plates and an electro-optical medium between the two supporting plates, a plurality of pixel-defining electrodes disposed on one of said plates, and at least one electrode disposed on the other of said plates, said pixel-defining electrodes having respective overlap locations overlapping said at least one electrode and respective non-overlapping locations, respective overlap locations of each of said plurality of pixel-defining electrodes and said one electrode defining pixels at the overlap locations, characterized in that the display further comprises:

a plurality of extra electrodes disposed between said pixel-defining electrodes, each of said pixel-defining electrodes having at least one of said extra electrodes adjacent thereto, said at least one of said extra electrodes having a thickness substantially equal to the thickness of the adjacent pixel-defining electrode, and means, supplying the extra electrodes with a fixed voltage during operation, for preventing capacitive coupling between said pixel-defining electrodes via said extra electrodes.

2. A display as claimed in claim 1, characterized in that the extra electrodes have a thickness of at least 100 nm.

3. A display as claimed in claim 1, characterized in that the extra electrodes and the pixel-defining electrodes are made of the same material.

4. A display as claimed in claim 1, characterized in that:

said means for supplying supplies the plurality of first extra electrodes with a fixed first voltage during operation, said one electrode is one of a plurality of second pixel-defining electrodes, and the display further comprises:

a plurality of second extra electrodes disposed between said second pixel-defining electrodes, each of said second pixel-defining electrodes having at least one of said second extra electrodes adjacent thereto, said at least one of said second extra electrodes having a thickness substantially equal to the thickness of the adjacent second pixel-defining electrode, and means for supplying the plurality of second extra electrodes with a fixed second voltage during operation.

5. A display as claimed in claim 4 characterized in that said fixed first voltage and said fixed second voltage are the same and are ground potential.

6. A display device comprising first and second supporting plates and an electro-optical medium between said supporting plates, a plurality of first pixel-defining electrodes disposed on said first supporting plate, and a plurality of second pixel-defining electrodes disposed on said second supporting plate, said first and second pixel-defining electrodes defining pixel locations at overlap locations, comprising respective drive elements provided for each of said first pixel-defining electrodes at respective areas, said first pixel-defining electrodes extending on said first supporting plate beyond said respective areas, characterized in that the display further comprises:

a plurality of first extra electrodes disposed between said first pixel-defining electrodes, each of said first pixel-defining electrodes having at least one of said extra electrodes adjacent thereto, said first extra electrodes having a thickness substantially equal to the thickness of the adjacent first pixel-defining electrodes, said extra electrodes being present at respective first locations which are disposed substantially opposite respective second locations which are located between respective second pixel-defining electrodes.

7. A display as claimed in claim 6, characterized in that the first extra electrodes and the pixel-defining electrodes are made of the same material.

8. A display as claimed in claim 6, characterized in that the first extra electrodes extend opposite supply electrodes connected to said first pixel-defining electrodes.

9. A display as claimed in claim 6, characterized in that the display further comprises a plurality of second extra electrodes disposed between said second pixel-defining electrodes, each of said second pixel-defining electrodes having at least one of said second extra electrodes adjacent thereto, each of said second extra electrodes having a respective thickness substantially equal to the thickness of the respective adjacent second pixel-defining electrode, and said second extra electrodes being present at respective second locations which are disposed substantially opposite respective locations which are located between respective first pixel-defining electrodes.

10. A display as claimed in claim 9, characterized in that said first pixel-defining electrodes and said second pixel-defining electrodes have respective supply electrodes connected thereto, and the extra electrodes on at least one of the supporting plates extend substantially throughout the supporting plate across parts of the supporting plate surface exposed by the pixel-defining electrodes and supply electrodes on the at least one of the supporting plates.

11. A display as claimed in claim 10, characterized in that each of the first extra electrodes and each of the second extra electrodes has a respective thickness of at least 100 nm.

12. A display as claimed in claim 10, characterized in that the first and second extra electrodes and the first and second pixel-defining electrodes are made of the same material.

13. A display device comprising two supporting plates and an electro-optical medium between the two supporting plates, a plurality of pixel-defining electrodes disposed on one of said plates, and at least one electrode disposed on the other of said plates, said pixel-defining electrodes having respective overlap locations overlapping said at least on electrode and respective non-overlapping locations, respective overlap locations of each of said plurality of pixel-defining electrodes and said one electrode defining pixels at the overlap locations, said pixel-defining electrodes having supply electrodes connected thereto, characterized in that the display further comprises:

a plurality of extra electrodes disposed between said pixel-defining electrodes, each of said pixel-defining electrodes having at least one of said extra electrodes adjacent thereto, said at least one of said extra electrodes having a thickness substantially equal to the thickness of the adjacent pixel-defining electrode, and said extra electrodes on at least one of said supporting plates extending substantially throughout the surface of said at least one of said supporting plates not covered by the pixel-defining electrodes and said supply electrodes on said at least one of said supporting plates.

14. A display as claimed in claim 13, characterized in that the display further comprises means, supplying the extra electrodes with a fixed voltage during operation, for preventing capacitive coupling between said pixel-defining electrodes via said extra electrodes.

15. A display device comprising:

two supporting plates and an electro-optical medium between the two supporting plates, a plurality of pixel-defining electrodes disposed on one of said plates, and at least one electrode disposed on the other of said plates, said pixel-defining electrodes having respective overlap locations overlapping said at least one electrode, respective overlap locations of each of said plurality of pixel-defining electrodes and said one electrode defining pixels at the overlap locations, and respective drive elements provided for each of said pixel-defining electrodes at respective areas, characterized in that said pixel-defining electrodes extend on said at least one supporting plate beyond said respective areas, and the display further comprises:

a plurality of extra electrodes disposed between said pixel-defining electrodes and extending respectively between said pixel-defining electrodes beyond said respective areas, each of said pixel-defining electrodes having at least one of said extra electrodes adjacent thereto, said at least one of said extra electrodes having a thickness substantially equal to the thickness of the adjacent pixel-defining electrode, and means, supplying the extra electrodes with a fixed voltage during operation, for preventing capacitive coupling between said pixel-defining electrodes via said extra electrodes.

16. A display as claimed in claim 15, characterized in that said fixed voltage is a ground potential.

17. A display as claimed in claim 15, characterized in that said one electrode is one of a plurality of second pixel-defining electrodes, and the display further comprises:

a plurality of second extra electrodes disposed between said second pixel-defining electrodes, each of said second pixel-defining electrodes having at least one of said second extra electrodes adjacent thereto, said at least one of said second extra electrodes having a thickness substantially equal to the thickness of the adjacent second pixel-defining electrode, and the display device comprises means for supplying the second extra electrodes with a fixed second voltage during operation.

18. A display as claimed in claim 17, characterized in that said second pixel-defining electrodes have supply electrodes connected thereto, and additional extra electrodes extend opposite respective ones of said supply electrodes connected to said second pixel-defining electrodes.

19. A display as claimed in claim 17, characterized in that the extra electrodes on at least one of the supporting plates extend substantially throughout said at least one supporting plate across parts of the supporting plate surface exposed by the pixel-defining electrodes and said supply electrodes on said at least one supporting plate, and said second pixel-defining electrodes have supply electrodes connected thereto, and additional extra electrodes extend opposite respective ones of said supply electrodes connected to said second pixel-defining electrodes.

* * * * *